United States Patent [19]
Kocis et al.

[11] Patent Number: 5,485,589
[45] Date of Patent: Jan. 16, 1996

[54] PREDICTIVE ADDRESSING ARCHITECTURE

[75] Inventors: Thomas J. Kocis; Anthony K. Patterson, both of Austin, Tex.

[73] Assignee: Dell USA, L.P., Austin, Tex.

[21] Appl. No.: 278,720

[22] Filed: Jul. 22, 1994

Related U.S. Application Data

[63] Continuation of Ser. No. 815,459, Dec. 31, 1991, abandoned.

[51] Int. Cl.⁶ .............................. G06F 12/02; G06F 13/00
[52] U.S. Cl. ............... 395/421.03; 395/375; 364/DIG. 1
[58] Field of Search .......................... 395/400, 425, 395/550; 365/238.5, 240, 233

[56] References Cited

U.S. PATENT DOCUMENTS

| | | | |
|---|---|---|---|
| 4,086,629 | 4/1978 | Desyllas et al. | 395/425 |
| 4,156,905 | 5/1979 | Fassbender | 395/400 |
| 4,370,711 | 1/1983 | Smith | 395/375 |
| 4,371,895 | 2/1983 | Koga | 348/413 |
| 4,583,162 | 4/1986 | Prill | 395/400 |
| 4,623,986 | 11/1986 | Chauvel | 395/425 |
| 4,626,912 | 12/1986 | Wilkinson | 395/425 |
| 4,729,092 | 3/1988 | Lupton | 395/425 |
| 4,750,839 | 6/1988 | Wang et al. | 365/238.5 |
| 4,799,222 | 1/1989 | Barlow et al. | 395/400 |
| 4,839,856 | 6/1989 | Tanaka | 395/425 |
| 4,870,622 | 9/1989 | Aria et al. | 365/238.5 |
| 4,918,587 | 4/1990 | Pechter et al. | 395/425 |
| 4,924,298 | 5/1990 | Kitamura | 348/394 |
| 4,942,520 | 7/1990 | Lagendorf | 395/425 |
| 5,007,011 | 4/1991 | Murayama | 395/425 |
| 5,099,415 | 3/1992 | Osler et al. | 395/400 |
| 5,113,511 | 5/1992 | Nelson et al. | 395/425 |
| 5,134,699 | 7/1992 | Aria et al. | 395/425 |
| 5,136,696 | 8/1992 | Beckwith et al. | 395/375 |
| 5,210,838 | 5/1993 | Jensen | 395/400 |
| 5,278,967 | 1/1994 | Curran | 395/425 |
| 5,307,469 | 4/1994 | Mann | 395/425 |

*Primary Examiner*—Michael A. Whitfield
*Attorney, Agent, or Firm*—Gary Stanford; James Huffman

[57] ABSTRACT

A computer system where memory access is accelerated by automatically incrementing the address at the memory chip inputs, as soon as the minimum hold time has occurred. If the next address actually requested by the CPU does not match this predicted address, then the actual address is driven onto the chip inputs as usual, so essentially no time is lost. However, if the automatically incremented address does match the next actually requested address, then a significant fraction of the chip's required access time has been saved.

15 Claims, 11 Drawing Sheets

PREDICTIVE ADDRESSING ARCHITECTURE

This is a continuation of application Ser. No. 07/815,459 filed on Dec. 31, 1991, now abandoned.

PARTIAL WAIVER OF COPYRIGHT PURSUANT TO 1077 O.G. 22 (3/20/87)

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to computer systems, and, more particularly, to memory control as used in personal computer systems.

Figure 1:
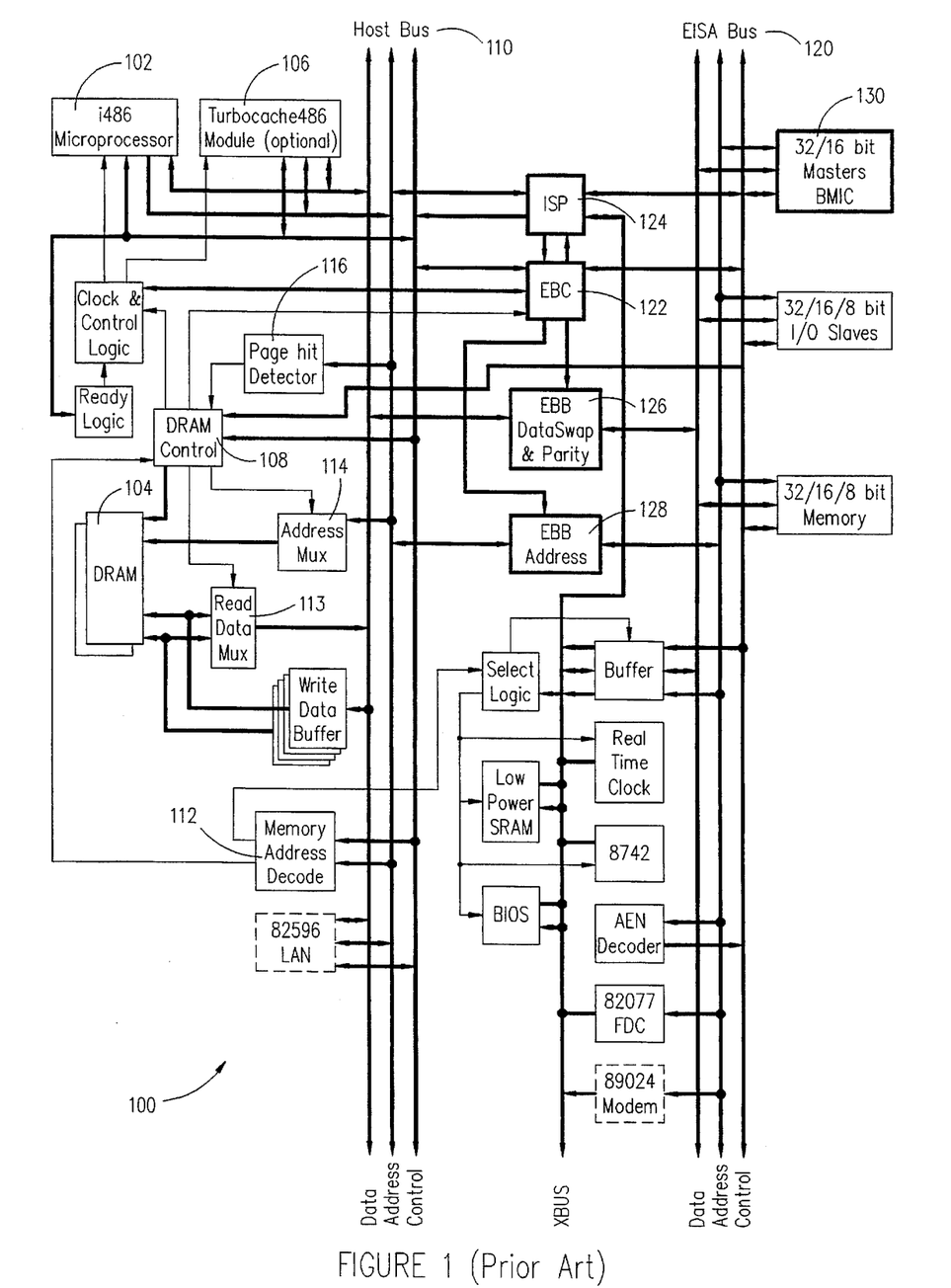
FIG. 1 is a functional/structural block circuit diagram of a prior art personal computer system.

FIG. 1 is a simplified schematic functional/structural block circuit diagram of a personal computer system labelled with reference numeral 100. System 100 includes 32-bit Processor 102, 16 megabyte (MB) DRAM memory 104 made up of more than one hundred 1 megabit DRAM chips with 80 nanosecond (nsec) access times plus fast page mode operation, 64 KB cache memory and controller 106, DRAM memory controller 108, 32-bit Host bus 110, Memory address decoder 112, Address multiplexer 114, Page hit detector 116, 32-bit EISA bus 120, EISA bus controller 122, Integrated system peripheral 124, EISA bus buffer 126 for data transfer between the buses, EISA bus buffer 128 for address transfer between the buses, EISA bus master 130 which typically has some supporting peripheral. DRAM controller 108 contains state machines to track the status of both Host bus 110 and EISA bus 120 and generate control signals. Processor 102 generates 32-bit addresses, but addresses in DRAM memory 104 only use the lowest 24 bits; that is, the 8 bits most significant bits (MSB) are all 0. The higher addresses may be for peripheral memory on EISA bus 120. The clock period of processor 102 is 30 or 40 nsec and thus when using DRAM memory 104 processor must effectively slow down by inserting wait states to allow the DRAM information to be read or written. The addition of cache memory 106 to duplicate selected portions of DRAM memory 104 provides an overall memory performance level approaching that of a large fast memory but with a cost not much more than that of an all DRAM memory. In particular, cache memory 106 stores recently used information (data and instructions) together with the information's address in DRAM memory 104. The locality of reference typically found in computer programs implies that such recently used information will likely be the information used next. Thus when processor 102 puts an address on Host bus 110 for a read, cache memory 106 checks the address to see if the information has been cached (already stored in cache memory); and if it has, then cache memory 106 supplies the information on Host bus 110 within one processor cycle and aborts the read of slower DRAM memory 104.

An alternative and complementary approach of the preferred embodiments to faster memory reads also relies on the locality of reference but to an even greater extent. This alternative simply predicts the address of an access based upon the previous access address. Thus a predicted address may be driven to DRAM memory before Processor 102 buts its actual access address on Host bus 110. A fast comparison of the actual and predicted address then determines whether to use the already-latched predicted address or perform a normal access cycle with the actual address. If the predicted address is used, the cycle can proceed at an accelerated pace.

A related approach in U.S. Pat. No. 5,007,011 determines the difference between two successive access addresses and then predicts that the next address will differ from the current address by the same difference. Similarly, U.S. Pat. No. 4,583,162 partitions memory into even and odd instruction address portions and predicts a next address by incrementing the current address by one which means an odd address engenders an even predicted address which sets up a read in the even memory portion. When the actual next address appears on the address bus a comparison with the predicted address determines whether the predicted read proceeds or whether the CPU pauses to permits the actual address to generate a read. However, this approach has the problems of requiring two addressable memory modules and imposing a penalty for instruction accesses that are not sequential in nature.

The present invention provides an improved system for address prediction for read or write access by incrementing the column address of the preceding address. Memory access is accelerated by automatically incrementing the address at the memory chip inputs, as soon as the minimum hold time has occurred. If the next address actually requested by the CPU does not match this predicted address, then the actual address is driven onto the chip inputs as usual, so essentially no time is lost. However, if the automatically incremented address does match the next actually requested address, then a significant fraction of the chip's required access time has been saved.

BRIEF DESCRIPTION OF THE DRAWINGS

The present invention will be described with reference to the accompanying drawings, which are schematic for clarity and which are incorporated in the specification hereof by reference, wherein.

DESCRIPTION OF THE PREFERRED EMBODIMENTS

The numerous innovation teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 2:
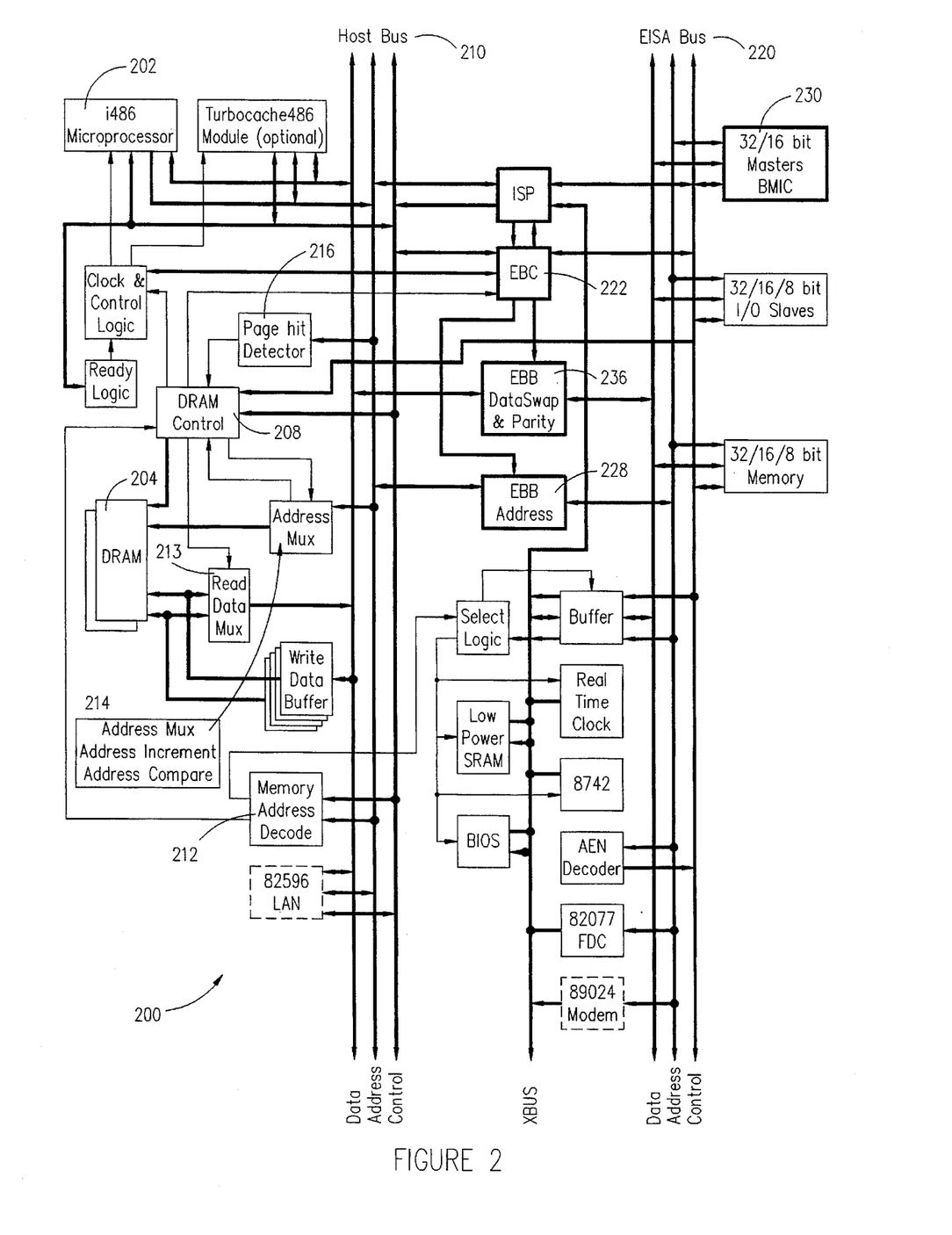
FIG. 2 is a functional/structural block circuit diagram of a preferred embodiment of a personal computer system.

FIG. 2 is a simplified schematic functional/structural block circuit diagram of a first preferred embodiment personal computer system labelled with reference numeral 200. System 200 includes the items of system 100 plus adds functionality to DRAM controller 208 and Address multiplexer 214 includes an address incrementer and comparator. DRAM controller 208 also contains state machines to track the status of the Host bus and the EISA bus. DRAM memory 204 contains 16 MB, so each byte address is 24 bits long with the bits denoted HA00 through HA23. Bits HA00–HA01 located a byte in a double word, and the two bits are decoded to the four byte lane designations HBE0–HBE3. Processor 202 is a 32-bit machine and Host bus is a 32-bit bus, both addresses and data, and the byte lane designations HBE0–HBE3 locate a byte within its 32-bit double word. The address and data and commands are buffered to EISA bus 220; and EISA bus controller 222 and Integrated System Peripheral 224 write to the appropriate peripheral. The bus clock for EISA bus 220 has a period of 120 nsec and is three or four times slower than Processor 102's 30 or 40 nsec clock on Host bus 210.

Figure 3:
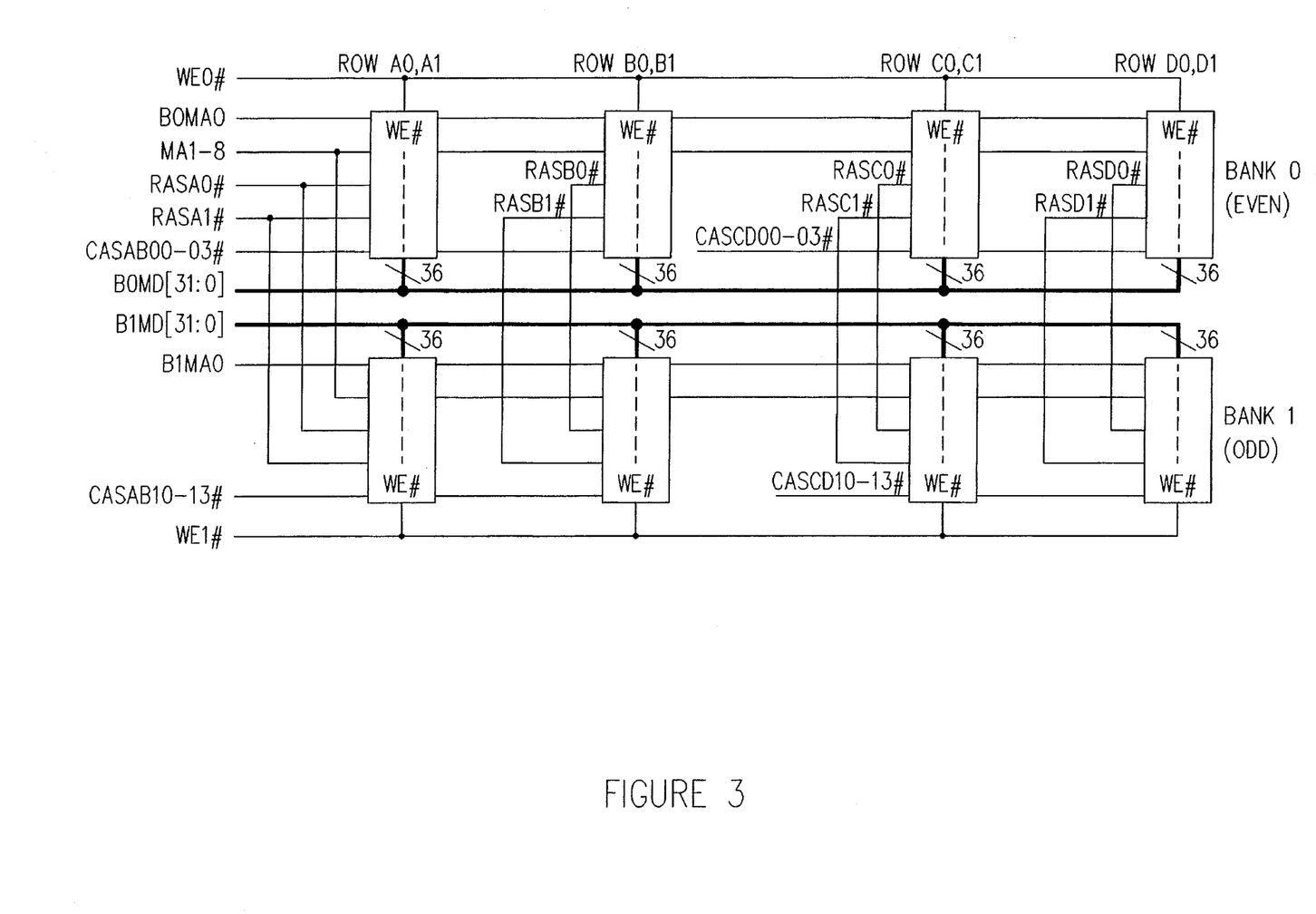
FIGS. 3–4 and 9 show memory organization.
Figure 4:
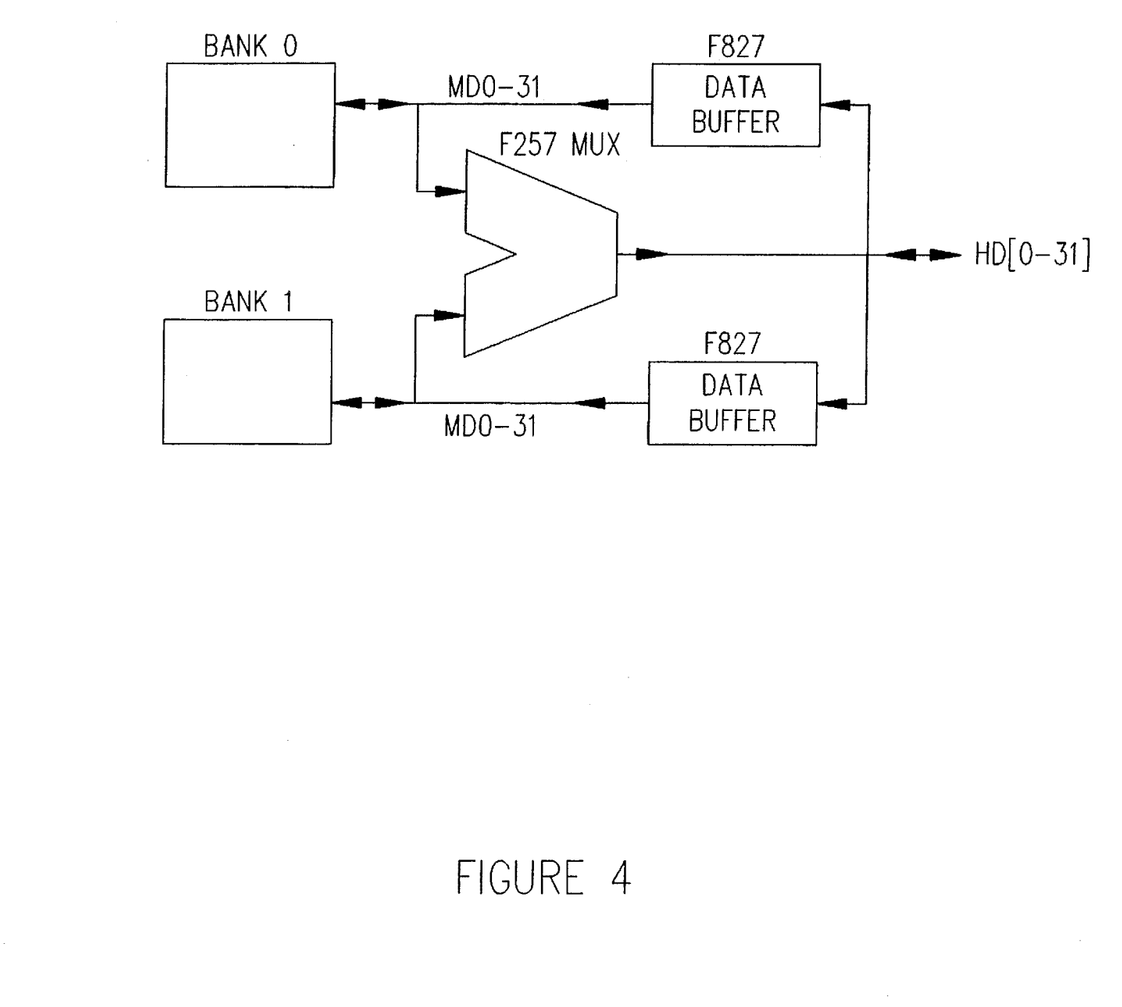

DRAM memory 204 physically comprises sixteen memory modules arranged as eight module rows with each module row consisting of two banks of modules. Each module includes eight 1 Mb DRAM chips organized as 256K ×4 bits (plus some parity bit chips) and each chip has multiplexed 9-bit chip row and 9-bit chip column addresses common within the modules. Bit HA02 determines the bank of memory modules containing the addressed data, the double words are interleaved between the banks. Bits HA03–HA11 are the nine chip column address bits and bits HA12–HA20 are the nine chip row address bits for the chips; and bits HA21–23 determine which of the eight module rows contains the addressed data. The bits HA21–HA23 are decoded to essentially gate the RAS# signal for the individual chips to select out the appropriate module row, and the four byte lane designations HBE0–HBE3 essentially gate the CAS# signal for the individual chips to select out the appropriate bytes of the double word output capacity. For a read, DRAM memory 204 puts an entire double word on the data lines, but for a write the selected byte(s) are written by only activating the appropriate chips. The typical DRAM chips used in DRAM memory 204 have chip row and chip column address bits time-multiplexed to halve the number of address pins; the chip row address bits typically precede the chip column address bits. FIG. 3 illustrates the module arrangement with the multiplexed chip row and chip column address bits denoted as MA0–MA8; however, for timing considerations the even/odd banks have differently sequenced MA0s which are denoted B0MA0 and B1MA0. FIG. 4 shows the data lines for the two banks of modules as multiplexed to Host bus data lines HD(31:0).

All addresses with the same chip row and module row address bits HA12–HA23 form a "page" of 4 KB, so the chip column addresses locate bytes within a page. Thus if the address for a read or write has the same chip row address bits as the address for the immediately preceding read or write (i.e., the addresses are on the same page), then the chip row address bits do not have to again be loaded into the DRAM chips and a faster column-only ("page mode") addressing becomes available. Page hit detector 216 indicates whether an address has the same chip row and module row address as the preceding address and thus whether page mode access is available. To understand the timing of page mode DRAM accesses in systems 100 and 200, first consider simplified system 500 illustrated in FIG. 5.

Figure 5:
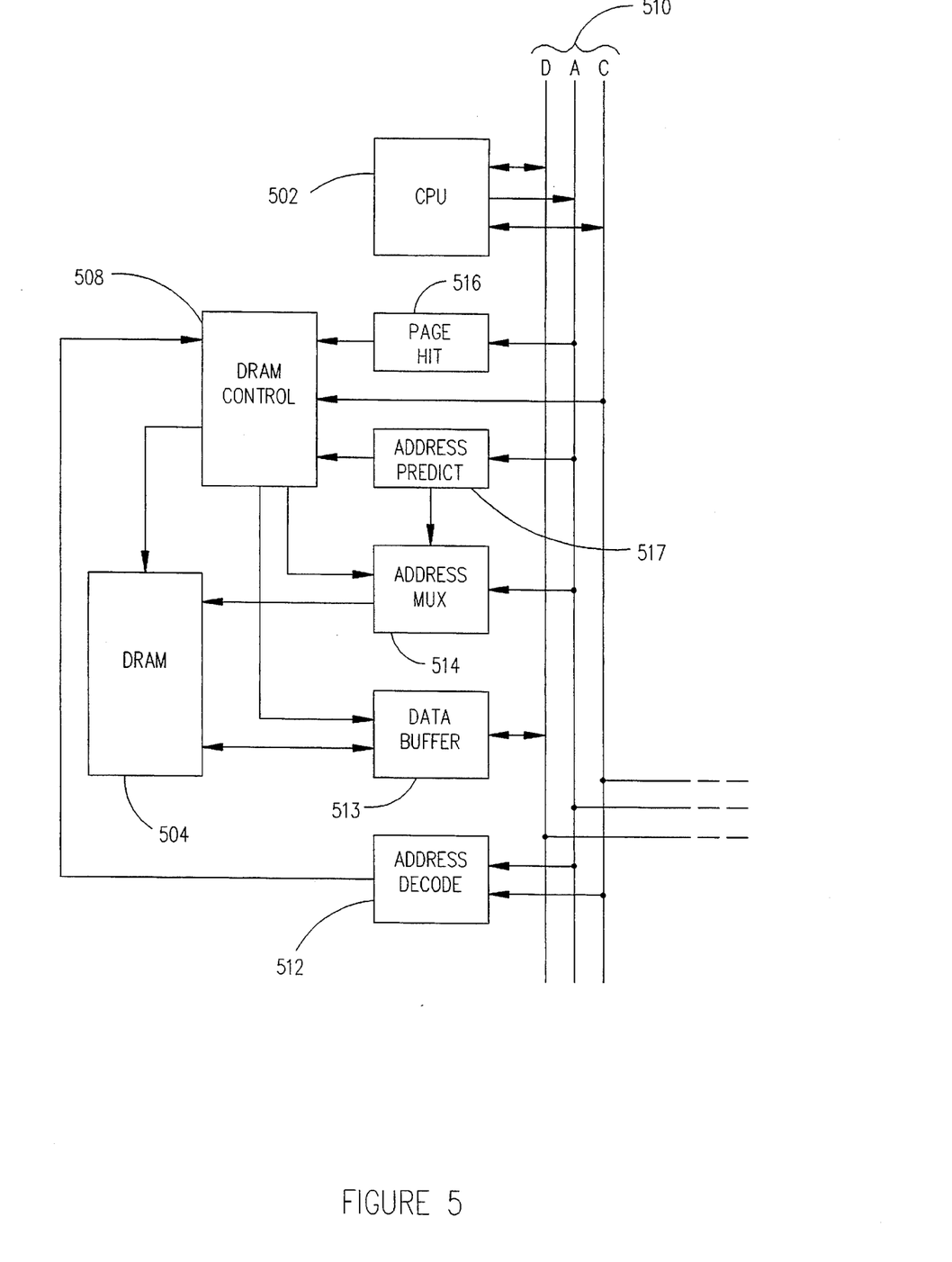
FIGS. 5–6 show a second sample embodiment of the computer system embodying the disclosed inventions.
Figure 7:
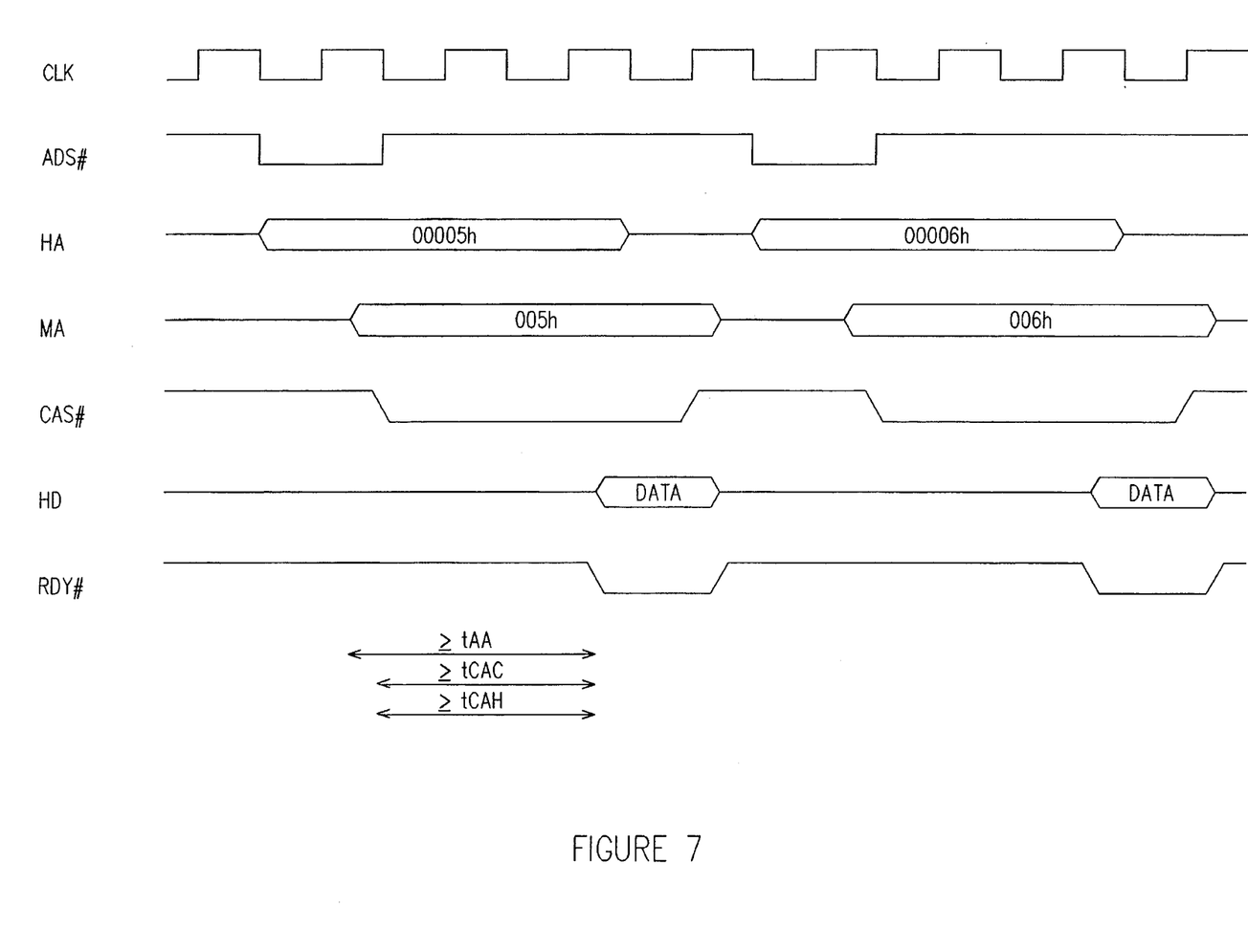
FIGS. 7 and 8 are timing diagrams which help to explain the operation of the system of FIGS. 5–6.

System 500 has an 8-bit data, 18-bit address processor 501 connected to host bus 510 with 256 KB DRAM memory 504 which consists of two 256K ×4 chips, DRAM controller 508, address decoder 512, data buffer 513, address multiplexer 514, page hit detector 516, address predictor 517; items such as the clock and control logic, ready logic, an external bus, peripherals, and so forth are not shown for clarity. Initially, consider a read of DRAM memory 504 by processor 502 when address predictor 517 is not operating. The read proceeds as follows and is illustrated in timing diagram FIG. 7. Processor drives the address (18 bits) onto the address lines of host bus 510 and the read commands onto the control lines of host bus 510; FIG. 7 shows this to take about half a clock period: CLK is the system clock, ADS# is the address status command (the timing of the read, memory, and control commands coincide with ADS# and are not shown for clarity), and HA indicates the address (00005h in the example). Typical times for a fast commercial processor would be a clock period of 30 nsec, and 16 nsec to drive the address and commands. Address decoder 512 interprets the address as applying to DRAM 504 and informs DRAM controller 508. Page hit detector 516 compares the bits of the address 00005h which determine the chip row address in DRAM 504 with the corresponding bits of the previous address and indicates to DRAM controller 508 whether the same chip row address will be used so that a page-mode access is available; presume that a page hit occurs so only the chip column address is needed for the read. Then controller 508 sets address multiplexer 514 to drive the chip column address (9 low order bits) into DRAM 504; this is indicated by memory address MA in FIG. 7, and the multiplexing and driving takes about 15 nsec. Now the DRAM has a minimum time from address in to data out (tAA) which is characteristic of the particular DRAM and in this embodiment is on the order of 40 nsec; thus the data out on the host bus indicated by HD in FIG. 7 trails the MA chip column address in by at least 40 nsec.

The deriving of the address and read commands onto host bus 510 by processor 502 and the indication of a DRAM access by address decoder 512 starts controller 508 at the next clock period generating the chip row and chip column address strobes RAS# and CAS# for DRAM 504. Page hit detector 516 outputs a page hit indication to controller 508 which keeps RAS# active low for page mode operation of DRAM 504 and which generates an active CAS# low in about 20 nsec as shown in FIG. 7. When CAS# goes low, presuming that the DRAM chip column address MA is set up, DRAM 504 begins cell sensing and outputs data after a characteristic time tCAC which is about 20 nsec for the embodiment. The chip column address MA must be setup for a time tASC prior to CAS# going active low; tASC is a further DRAM characteristic but is 0 nsec in this embodiment. Now the chip column address MA must hold for a time tCAH (about 15 nsec in the embodiment) after CAS# has gone low, which is another DRAM characteristic. Once the data is setup on the host bus, the ready signal (RDY#) indicates to processor 502 that the data is ready for reading and the read bus cycle ends. FIG. 7 shows the time intervals that must exceed tAA, tCAC, and tCAH and also shows a second read from chip column address 006h (and same chip row address) following the first read.

Figure 6:
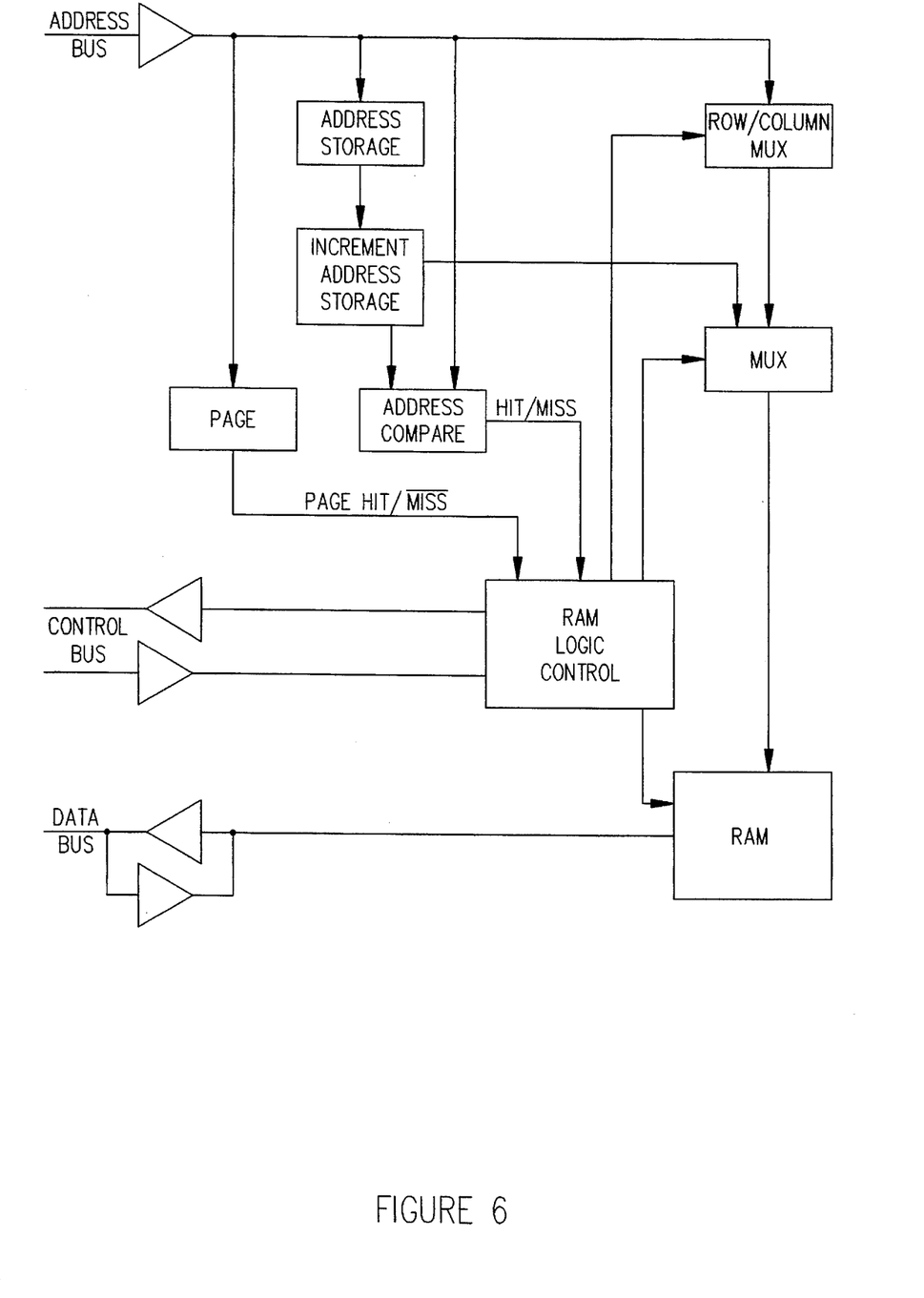
Figure 8:
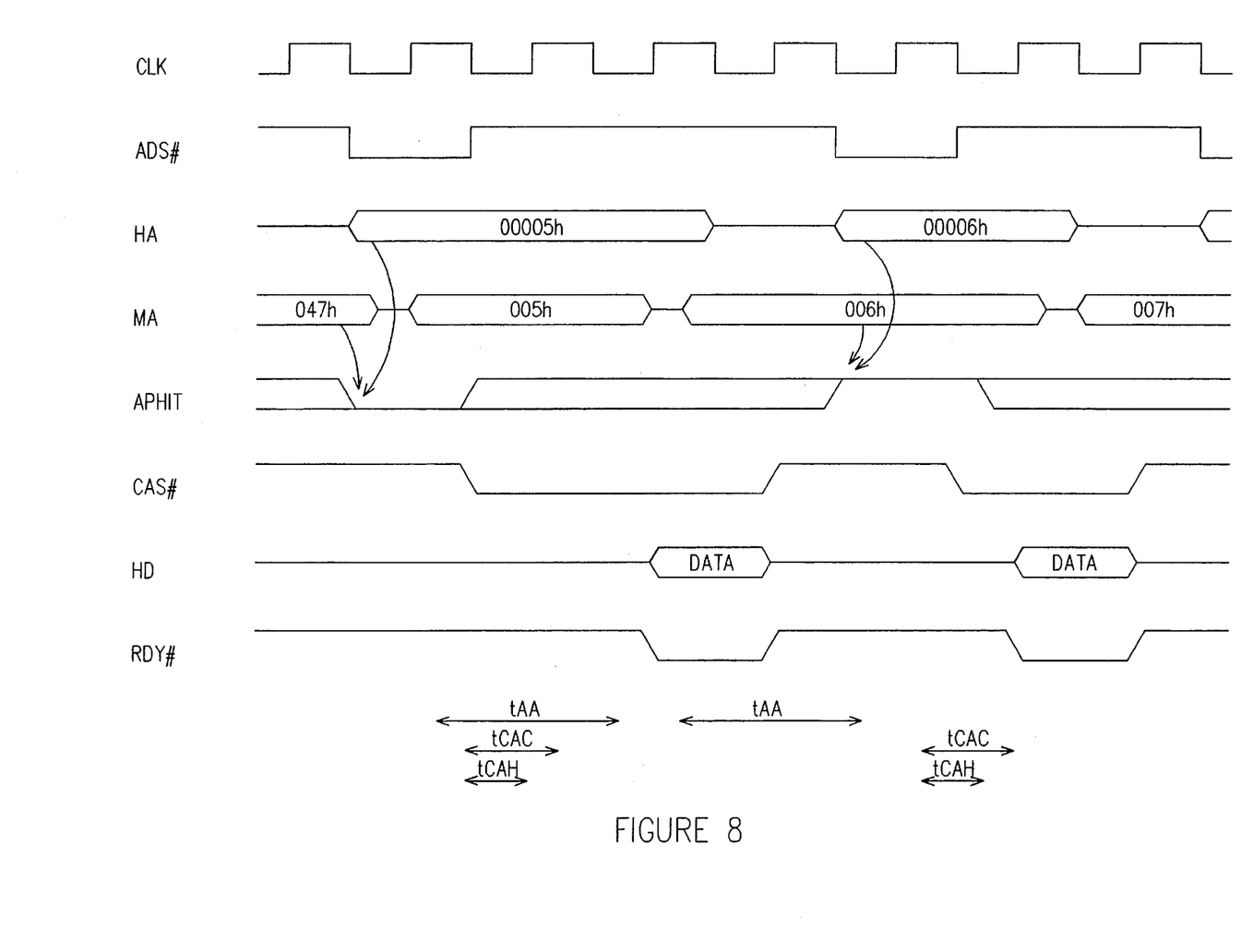

FIG. 8 is the analog of FIG. 7 but with address predictor 517 enabled. Address predictor 517 may have hardware similar to page hit detector 516 and just be a register for holding the previous chip column address bits plus an adder to increment the lowest chip column address bit and a comparator to rapidly compare the predicted chip column address bits (previous chip column address incremented by 1) to the actual chip column address bits on host bus 510. FIG. 6 shows a possible hardware implementation. Address predictor 517 operates about as fast as page hit detector 516, and both provide controller 508 with indications of page hit and address prediction hit (APHIT) within 12–14 nsec. The predicted chip column address can be driven to DRAM once the address hold time tCAH passes, and thus the actual address plus the address multiplexer 514 delay to generate the chip column address MA can be essentially avoided and tAA effectively begins earlier. Indeed, with a page hit presumed, FIG. 8 illustrated the CLK, ADS#, and HA as in FIG. 7 with the lefthand portion of FIG. 8 showing a first read with a predicted address miss (the previous chip column address was 046h so the predicted chip column address 047h missed the actual chip column address 005h) and with the righthand portion showing a second read with a predicted address hit (006h). In particular, the first read has the MA chip column address driven with the predicted chip column address 047h, but the actual chip column address is 005h, so APHIT is low. With APHIT low controller 508 permits address multiplexer 514 to generate the chip column address as described in connection with FIG. 7, and CAS# and the data appear as before. However, the center portion of FIG. 8 also shows DRAM 504 being driven with the predicted address 006h on MA immediately after tCAH and prior to processor 502 putting 00006h on host bus 510. Next, the righthand portion of FIG. 8 shows address predictor 517 indicating to controller 508 that the chip column address bits of the address just driven onto host bus 510 match the predicted address, so controller 508 instructs address multiplexer 514 to continue driving the currently driven predicted address. Thus when CAS# goes active low, the time tCAC of DRAM 504 determines the delay until data is on host bus 510 as compared to tAA limiting the access as in the lefthand portion of FIG. 8. In the typical example, tAA is 40 nsec whereas tCAC is 20 nsec and tASC is 0 nsec, thus a potential saving of 20 nsec. And this is sufficient to make the data available to processor 502 one clock period earlier and save a wait state. Further, a predicted address hit could generate an earlier CAS# to create additional time savings.

Figure 9:
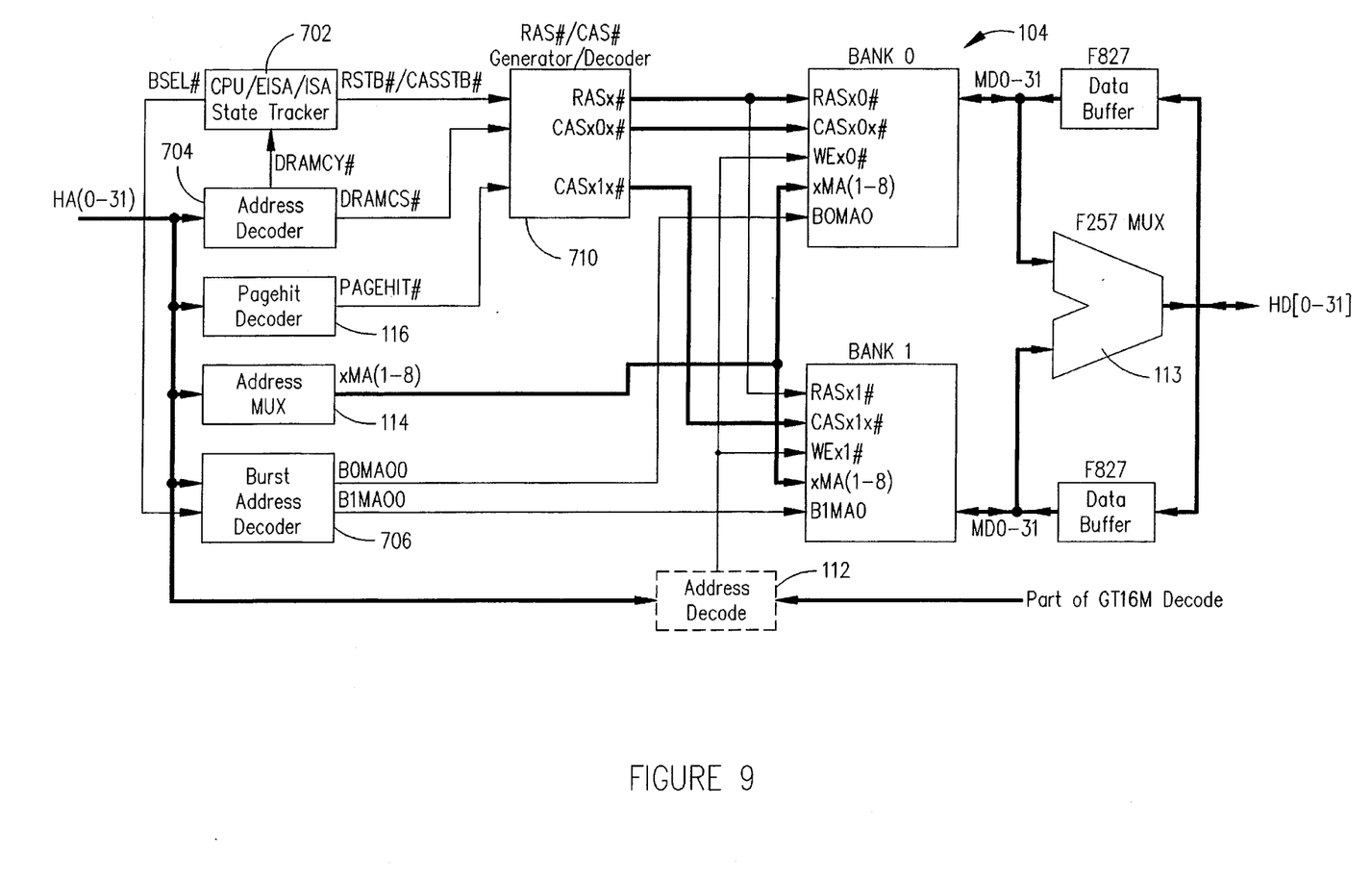

Return to systems 100 and 200. The first preferred embodiment provides a chip column address prediction, so first consider system 100 in more detail. FIG. 9 shows DRAM memory 104 split into banks 0 and 1, page hit detector 116, address multiplexer 114, memory address decoder 112, and DRAM controller 108 components including state machines 702, address decoder 704, burst address decoder 706, and RAS#/CAS# generator 710. Recall that the 9-bit chip row and chip column addresses which will be latched into the DRAM chips come from bits HA12–HA20 and HA03–HA11, respectively, and these bits are held in Address multiplexer 114 and Burst address decoder 706 to form the nine memory address bits MA0–MA8. Note that MA0 comes from decoder 706 which can generate a toggling of MA0 in the chip column address for a burst read that also uses a toggling of the bank to read a line consisting of four double words with addresses only differing by bank number and MA0; that is, bits HA02–HA03. Also, recall that bits HA00–HA01 indicate the four bytes per double word and are not significant for a read operation because all four bytes are always put onto the double word (32-bit) data bus. Lastly, bits HA21–HA23 indicate the module row (A0, A1, B0, B1, C0, C1, D0, and D1 in FIG. 3).

For a read, processor 102 puts the address bits HA00–HA23 onto the address bus during a clock period; the Host bus state machine switches from state HS0 during this clock period to state HS1. Thus page hit decoder 116 may make a comparison with the page of previous address which has been held in a register and set PAGEHIT in the second clock period. Also, address multiplexer 114 and burst decoder 706 can start multiplexing the address into two sets of MA0–MA8 bits. The bits HA21–HA23 are decoded to select the module row (A0–D1) but does not decide between the banks; for an address in the same page as the previous address, these bits do not change. Thus with a same page address (page mode), PAGEHIT will be high and multiplexer 114 and decoder 706 will apply the chip column address to the DRAM chips (see FIG. 3). Then in page mode period CAS# will go low to drive CASxx0xx# to the CAS# pin of DRAM chips in bank 0 or CASxx1xx# to the CAS# pin of DRAM chips in bank 1 depending upon bit HA02 which selects among the banks. This activates the access to the DRAM chips and after the time delays tCAC or tAA the data appears on the internal bus from a bank to multiplexer 113.

Figure 10:
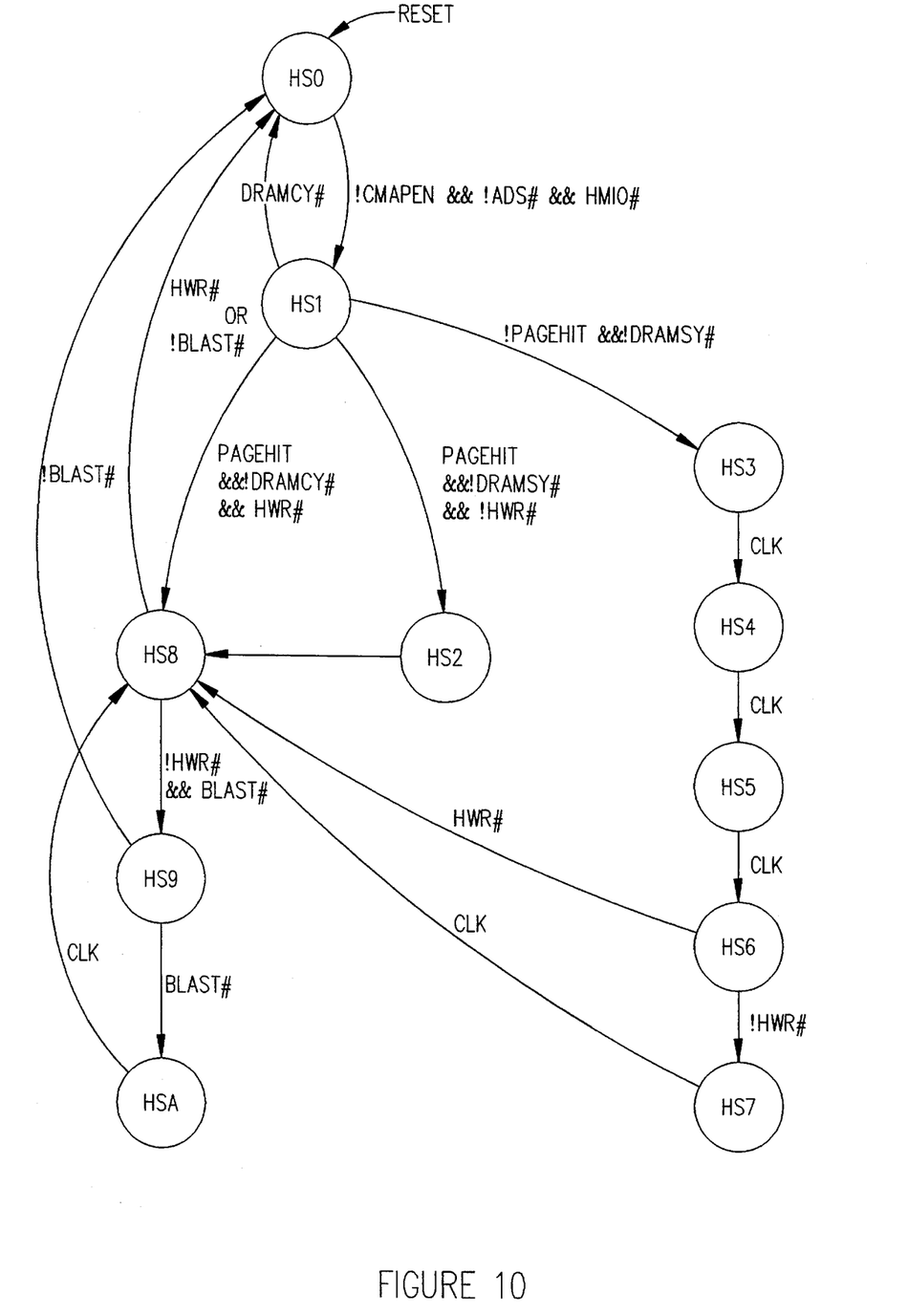
FIG. 10 is a state diagram for the system of FIG. 1.

A more complete description of system 100 appears in FIG. 10 which shows the state diagram for the state machine tracking the status of Host bus 110 of system 100 during read and write operations as follows. Beginning in host bus state HS0 at the top of FIG. 10, an asserted ADS# together with inactive CMAPEN# (the enable for writing to the address decode mapping SRAM) and high HMIO# (the selection between memory and input/output devices) puts the Host bus into the HS1 state and corresponds to a first clock cycle. From state HS1 the three paths to states HS8, HS2, and HS3 correspond (from left to right in FIG. 10) to a same page (PAGEHIT) write (HWR#) to DRAM (!DRAMCY#), a same page (PAGEHIT) read (!HWR#) from DRAM (!DRAMCY#), and a different page (!PAGEHIT) read or write access to DRAM (!DRAMCY#). Again, the state change takes a clock cycle. State HS2 transitions into state HS8 in another clock cycle which indicates that a read in page mode is slower than a write. State HS3 takes three clock cycles to go to state HS6, during such page miss reads and writes the RAS# and CAS# are being generated and the address multiplexer 114 is successively putting the chip row and chip column addresses into the DRAM chips. State HS6 transitions to state HS8 for a write (HWR#) but to state HS7 for a read during the next clock cycle, and state HS7 goes to state HS8 in another clock cycle, again indicating that a read is slower than a write. State HS8 returns to initial state HS0 if the read or write is either a single access or the last of a burst (!BLAST#) whereas if the read is part of a burst (BLAST#) then states HS9 and HSA may be entered.

For the first preferred embodiment a read includes both a page hit and an address prediction speed up. Address multiplexer 214 adds an address predictor. Again in page mode (a page hit), Address multiplexer 214 puts the multiplexed address bits MA0–MA8 into registers in the same manner as address multiplexer 114 and burst address decoder 706, but multiplexer 214 also has previously generated a prediction address by adding 1 to the prior chip column address and has already driven this chip column address to the DRAM chips. Then during the second clock period when page hit detector 216 is comparing HA12–HA23 (the chip row portion of the actual address) to the corresponding bits of the prior address to determine whether the page remains the same, decoder 214 is simultaneously comparing HA03–HA11 with the corresponding bits of the prediction address. If the bits match, then the address prediction hit (APHIT) signal goes high at about the same time that PAGEHIT would go high for a page hit. Then the multiplexing of the address on Host bus 210 is halted and the already-driven-to-DRAM chip column address is still used. This is analogous to the situation of system 500 illustrated in FIGS. 5–7. Again, the multiplexing time is saved.

Figure 11:
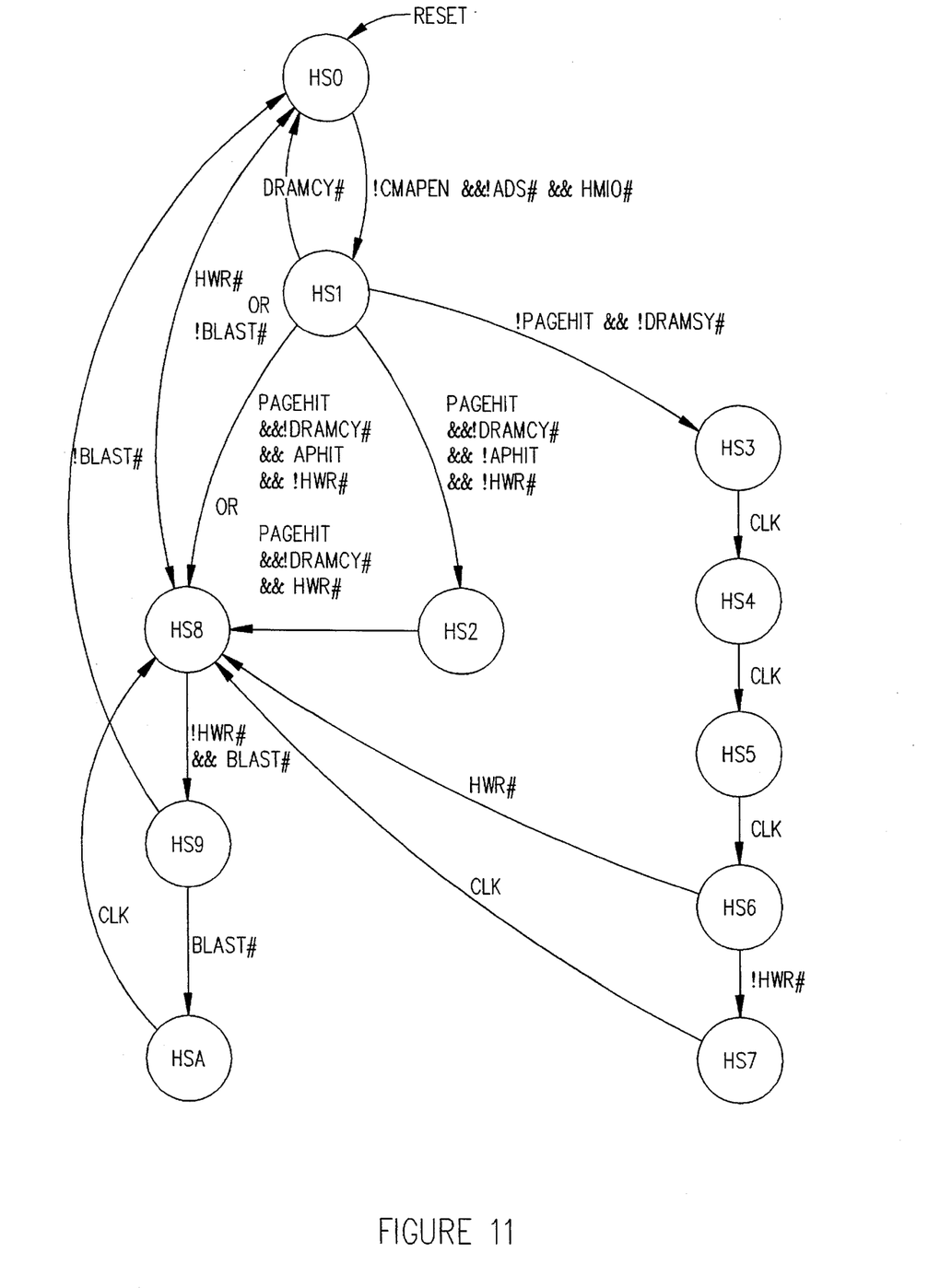
FIG. 11 is a state diagram for the system of FIG. 2.

FIG. 11 shows the Host bus state machine for the first preferred embodiment with the APHIT signal included. A comparison with FIG. 10 illustrates the difference that system 200 makes a transition from state HS1 directly to state HS8 for a memory read with an address prediction hit (APHIT) but does to state HS2 for an address prediction miss (!APHIT) analogous to the case for all memory reads in system 100. The following table lists the number of clock cycles for single reads and writes for systems 100 and 200:

| Cycle type | System 100 | System 200 |
|---|---|---|
| Read page miss | 8 | 8 |
| Write page miss | 7 | 7 |
| Read page hit and address predict miss | 4 | 4 |
| Read page hit and address predict hit | 4 | 3 |
| Write page hit | 3 | 3 |

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, at least some of the disclosed innovations could also be applied to an all SRAM memory, where no page structure, and no multiplexing of addresses, is used. This all SRAM version of memory could also take advantage of the address prediction by driving a predicted address prior to the actual address appearing on the bus. The comparison of actual address to predicted address is faster than the decoding of the address by the SRAM, so time can be saved.

For another example, in the presently preferred embodiment the increment is not in the lowest bits (2) that define byte lanes, but in the lowest bit that goes into the RAM chips; but this too can (alternatively and less preferably) be modified to any appropriate offset of the actual address to generate the predicted address if desired.

The increment of the chip column address is in the lowest bit that goes into the RAM chips for successive accesses, so interleaved memories also may use the address prediction. Indeed, page-interleaved memories can also use the address prediction.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A memory subsystem, comprising:

bus interface logic, connected to and configured to read from and write to a first bus which includes a plurality of data lines and a plurality of address lines;

an address bus;

a memory device having a plurality of externally accessible contacts for address, data and control signals, wherein said externally accessible contacts for said address signals are coupled to said address bus; said memory device requiring a predetermined minimum setup and hold time for reliable reception of each successively received address;

a memory controller circuit, operatively connected to said lines of said first bus and to said contacts of said memory device, and configured to receive addresses from said address lines of said first bus and to conditionally supply addresses to said memory device on said address bus;

and wherein, in at least a first mode of operation, when said memory controller circuit receives signals corresponding to a given address from said first bus, said memory controller circuit supplies said given address to said memory device on said address bus for approximately said predetermined minimum setup and hold time, and then immediately increments said given address to produce a predicted address and supplies said predicted address to said memory device on said address bus; and, as soon as said memory controller circuit receives signals corresponding to a next address from said first bus, said memory controller circuit compares said next address with said predicted address, and, if said next address differs from said predicted address, said memory controller circuit immediately begins to supply said next address to said memory device on said address bus.

2. A method of operating a computer system which includes at least one central processing unit (CPU), and a random-access memory (RAM) operatively connected on an address bus so that said CPU can read and programmably execute application software programs therefrom, comprising the steps of:

(a.) when said CPU requests access to a given address in said RAM, supplying said given address on said address bus to said RAM for a predetermined minimum setup and hold time;

(b.) immediately incrementing said given address to produce a predicted address and supplying said predicted address on said address bus to said RAM; and (c.) as soon as said CPU generates signals corresponding to a next address, comparing said next address with said predicted address, and, if said next address differs from said predicted address, immediately supplying said next address on said address bus to said RAM.

3. A computer system, comprising:

at least one central processing unit (CPU); at least one program storage unit, connected so that said CPU can read and programmably execute application software programs therefrom;

a first bus, including a plurality of data lines and a plurality of address lines operatively connected to be written to and read from by said CPU;

an address bus;

a memory device having a plurality of externally accessible contacts for address, data and control signals, wherein said externally accessible contacts for said address signals are coupled to said address bus; said memory device requiring a predetermined minimum setup and hold time for reliable reception of each successively received address;

a memory controller circuit, operatively connected to said lines of said first bus and to said contacts of said memory device, and configured to receive addresses from said address lines of said first bus and to conditionally supply addresses to said memory device on said address bus;

and wherein, in at least a first mode of operation, when said memory controller circuit receives a given address from said first bus, said memory controller circuit supplies said given address to said memory device on said address bus for approximately said predetermined minimum setup and hold time, and then immediately increments said given address to produce a predicted address and supplies said predicted address to said memory device on said address bus; and, as soon as said memory controller circuit receives a next address from said first bus, said memory controller circuit compares said next address with said predicted address, and, if said next address differs from said predicted address, said memory controller circuit immediately supplies said next address to said memory device on said address bus.

4. The system of claim 3, wherein said memory device comprises dynamic random access memory (DRAM), and said memory controller circuit periodically commands said memory device to initiate refresh cycles.

5. The system of claim 3 wherein said memory controller circuit increments said given address by one to produce said predicted address.

6. The system of claim 3 wherein said memory controller circuit includes at least one logic device.

7. The system of claim 3, wherein a first set of contacts of said memory device is dedicated to receiving column addresses, and a second set of said contacts of said memory device is multiplexed between data and row addresses.

8. The system of claim 3, wherein a first set of said contacts of said memory device is dedicated to receiving column addresses, and a second set of said contacts of said memory device is multiplexed between data and row addresses, and a third set of said contacts of said memory device is dedicated to receiving row and column address strobe signals.

9. The system of claim 3, wherein a first one of said contacts of said memory device is dedicated to receiving a row address strobe signal, and a second one of said contacts of said memory device is dedicated to receiving a column address strobe signal.

10. A computer system, comprising:

at least one central processing unit (CPU); at least one program storage unit, connected so that said CPU can read and programmably execute application software programs therefrom;p a plurality of I/O devices, including at least one input device and at least one output device, which are operatively connected to said CPU;

a first bus, including a plurality of data lines and a plurality of address lines operatively connected to be written to and read from by said CPU;

an address bus;

a memory device having a plurality of externally accessible contacts for address, data, row-address-strobe (RAS), and column-address strobe (CAS) signals, wherein said externally accessible contacts for said address signals are coupled to said address bus; said memory device requiring a predetermined minimum setup and hold time for reliable reception of each successively received address;

a memory controller circuit, operatively connected to said lines of said first bus and to said contacts of said memory device and to said address bus; and wherein, when said memory controller circuit receives signals corresponding to a given address which differs from a previous address in only a predetermined subset of the bits thereof, said memory controller circuit supplies said predetermined subset of the bits of said given address to said memory device, and activates said CAS signal to said memory device on said address bus; and, as soon as said given address has been supplied to said memory device for approximately said predetermined setup and hold time, said memory controller circuit immediately offsets said predetermined subset of bits of said given address to produce a predicted address, and supplies said predicted address to said memory device on said address bus; and, as soon as said memory controller circuit receives signals corresponding to a next address from said first bus, said memory controller circuit compares said next address with said predicted address, and, if said next address differs from said predicted address, said memory controller circuit immediately supplies said next address to said memory device on said address bus.

11. The system of claim 10, wherein said memory device comprises dynamic random access memory (DRAM), and said memory controller circuit also periodically commands said memory device to initiate refresh cycles.

12. The system of claim 10, wherein said memory controller circuit increments said predetermined subset of bits of said given address by one to produce said predicted address.

13. The system of claim 10, wherein said memory controller circuit includes at least one logic device.

14. The system of claim 10, wherein a first set of said contacts of said memory device is dedicated to receiving column addresses, and a second set of said contacts of said memory device is multiplexed between data and row addresses.

15. The system of claim 10, wherein a first set of said contacts of said memory device is dedicated to receiving column addresses, and a second set of said contacts of said memory device is multiplexed between data and row addresses, and a third set of said contacts said memory device is dedicated to receiving row and column address strobe signals.

* * * * *